United States Patent
Angiolillo et al.

(10) Patent No.: US 9,462,353 B2
(45) Date of Patent: Oct. 4, 2016

(54) SYSTEMS AND METHODS FOR PROVIDING A SHARED FOLDER VIA TELEVISION

(71) Applicant: Verizon Laboratories Inc., Waltham, MA (US)

(72) Inventors: Joel S. Angiolillo, Weston, MA (US); Xi Zhang, Newton, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 0 days.

(21) Appl. No.: 14/244,057

(22) Filed: Apr. 3, 2014

(65) Prior Publication Data

US 2014/0215509 A1 Jul. 31, 2014

Related U.S. Application Data

(63) Continuation of application No. 11/356,092, filed on Feb. 17, 2006, now Pat. No. 8,713,615.

(51) Int. Cl.
| | |
|---|---|
| *H04N 21/6334* | (2011.01) |
| *H04N 21/41* | (2011.01) |
| *H04N 21/433* | (2011.01) |
| *H04N 21/443* | (2011.01) |
| *H04N 21/4788* | (2011.01) |

(Continued)

(52) U.S. Cl.
CPC ........ *H04N 21/6334* (2013.01); *H04N 21/274* (2013.01); *H04N 21/4113* (2013.01); *H04N 21/4331* (2013.01); *H04N 21/443* (2013.01); *H04N 21/4788* (2013.01); *H04N 21/8126* (2013.01); *H04N 21/858* (2013.01)

(58) Field of Classification Search
None
See application file for complete search history.

(56) References Cited

U.S. PATENT DOCUMENTS

| | | | |
|---|---|---|---|
| 4,918,603 A | 4/1990 | Hughes et al. | |
| 5,018,736 A | 5/1991 | Pearson et al. | |

(Continued)

FOREIGN PATENT DOCUMENTS

| | | |
|---|---|---|
| CN | 1517930 | 8/2004 |
| EP | 1489800 | 12/2004 |

(Continued)

OTHER PUBLICATIONS

"AINGR: Switch—Service Control Point (SCP)/Adjunct Interface," Telcordia Technologies Generic Requirements, GR-1299-CORE, Issue 7, 542 pages, Nov. 2001.

(Continued)

*Primary Examiner* — Omar S Parra

(57) ABSTRACT

An enhanced television service provides a shared folder over a television network, such as a fiber optic network. Users, the service provider, or trusted sources, share use of a program folder via television. A user recommends content, such as a program listing, to other geographically dispersed subscribers, by sending the content to the subscribers' shared folder. Users may create a personal content guide for use instead of a standard program guide that contains identical listings for all subscribers. The shared folder may consist of programs from a variety of channels as well as other content and may be populated by trusted sources in remote locations. Users may search for content that matches search criteria and may delete or edit listings from the shared folder. The contents of the folder may not only include program listings, but also other content such as movies, television shows, web sites, photos, home videos, etc.

20 Claims, 11 Drawing Sheets

(51) Int. Cl.
  *H04N 21/81*    (2011.01)
  *H04N 21/858*   (2011.01)
  *H04N 21/274*   (2011.01)

(56) References Cited

U.S. PATENT DOCUMENTS

| | | | |
|---|---|---|---|
| 5,155,591 | A | 10/1992 | Wachob |
| 5,846,132 | A | 12/1998 | Junkin |
| 5,860,862 | A | 1/1999 | Junkin |
| 5,945,987 | A | 8/1999 | Dunn |
| 5,971,854 | A | 10/1999 | Pearson et al. |
| 6,009,355 | A | 12/1999 | Obradovich et al. |
| 6,081,830 | A | 6/2000 | Schindler |
| 6,165,071 | A | 12/2000 | Weiss |
| 6,193,610 | B1 | 2/2001 | Junkin |
| 6,280,323 | B1 | 8/2001 | Yamazaki et al. |
| 6,324,694 | B1 | 11/2001 | Watts et al. |
| 6,371,855 | B1 | 4/2002 | Gavriloff |
| 6,442,598 | B1 | 8/2002 | Wright et al. |
| 6,565,084 | B1 | 5/2003 | Katz et al. |
| 6,669,565 | B2 | 12/2003 | Liegey |
| 6,688,978 | B1 | 2/2004 | Herman |
| 6,733,383 | B2 | 5/2004 | Busse et al. |
| 6,749,198 | B2 | 6/2004 | Katz et al. |
| 6,760,595 | B2 | 7/2004 | Inselberg |
| 6,773,350 | B2 | 8/2004 | Yoshimi et al. |
| 6,774,926 | B1 | 8/2004 | Ellis et al. |
| RE38,600 | E | 9/2004 | Mankovitz |
| 6,811,484 | B2 | 11/2004 | Katz et al. |
| 7,001,279 | B1 | 2/2006 | Barber et al. |
| 7,006,616 | B1 | 2/2006 | Christofferson et al. |
| 7,120,871 | B1 | 10/2006 | Harrington |
| 7,123,930 | B2 | 10/2006 | Inselberg |
| 7,159,235 | B2 | 1/2007 | Son et al. |
| 7,178,158 | B2 | 2/2007 | Nishina et al. |
| 7,243,139 | B2 | 7/2007 | Ullman et al. |
| 7,294,776 | B2 | 11/2007 | Tohgi et al. |
| 7,298,831 | B1 | 11/2007 | Keohane et al. |
| 7,346,556 | B2 | 3/2008 | Upendran et al. |
| 7,409,437 | B2 | 8/2008 | Ullman et al. |
| 7,631,327 | B2 | 12/2009 | Dempski et al. |
| 7,669,219 | B2 | 2/2010 | Scott |
| 2002/0059621 | A1 | 5/2002 | Thomas et al. |
| 2002/0089610 | A1 | 7/2002 | Ohno et al. |
| 2002/0138843 | A1 | 9/2002 | Samaan et al. |
| 2002/0142842 | A1 | 10/2002 | Easley et al. |
| 2002/0144273 | A1 | 10/2002 | Reto |
| 2002/0157099 | A1 | 10/2002 | Schrader et al. |
| 2002/0157101 | A1 | 10/2002 | Schrader et al. |
| 2002/0166123 | A1 | 11/2002 | Schrader et al. |
| 2003/0002849 | A1 | 1/2003 | Lord |
| 2003/0005446 | A1 | 1/2003 | Jaff et al. |
| 2003/0028892 | A1 | 2/2003 | Gewickey et al. |
| 2003/0172375 | A1 | 9/2003 | Shaw et al. |
| 2003/0182663 | A1 | 9/2003 | Gudorf et al. |
| 2003/0191816 | A1 | 10/2003 | Landress et al. |
| 2003/0229900 | A1 | 12/2003 | Reisman |
| 2004/0017396 | A1 | 1/2004 | Werndorfer et al. |
| 2004/0019912 | A1 | 1/2004 | Staack |
| 2004/0031058 | A1 | 2/2004 | Reisman |
| 2004/0117852 | A1 | 6/2004 | Karaoguz et al. |
| 2004/0139233 | A1 | 7/2004 | Kellerman et al. |
| 2004/0159215 | A1 | 8/2004 | Tohgi et al. |
| 2004/0168187 | A1 | 8/2004 | Chang |
| 2004/0194137 | A1 | 9/2004 | Shreesha |
| 2004/0198495 | A1 | 10/2004 | Cisneros et al. |
| 2004/0231003 | A1 | 11/2004 | Cooper et al. |
| 2004/0261106 | A1 | 12/2004 | Hoffman |
| 2005/0028208 | A1 | 2/2005 | Ellis et al. |
| 2005/0066362 | A1 | 3/2005 | Rambo |
| 2005/0066364 | A1 | 3/2005 | Rambo |
| 2005/0076362 | A1 | 4/2005 | Dukes et al. |
| 2005/0086358 | A1 | 4/2005 | Rosenberg |
| 2005/0091694 | A1 | 4/2005 | Rambo |
| 2005/0108767 | A1 | 5/2005 | Ma |
| 2005/0227676 | A1 | 10/2005 | De Vries |
| 2005/0246457 | A1 | 11/2005 | Parry et al. |
| 2005/0246757 | A1* | 11/2005 | Relan et al. .................. 725/135 |
| 2005/0262542 | A1 | 11/2005 | DeWeese et al. |
| 2006/0015745 | A1 | 1/2006 | Sukigara et al. |
| 2006/0039361 | A1 | 2/2006 | Ohno et al. |
| 2006/0123455 | A1 | 6/2006 | Pai et al. |
| 2006/0137015 | A1 | 6/2006 | Fahrny et al. |
| 2006/0183547 | A1 | 8/2006 | McMonigle |
| 2007/0028287 | A1 | 2/2007 | Yamamoto et al. |
| 2007/0060380 | A1 | 3/2007 | McMonigle et al. |
| 2007/0061837 | A1 | 3/2007 | Dadush |
| 2007/0107019 | A1 | 5/2007 | Romano et al. |
| 2007/0115845 | A1 | 5/2007 | Hochwarth et al. |
| 2007/0124795 | A1 | 5/2007 | McKissick et al. |
| 2007/0129123 | A1 | 6/2007 | Eryou et al. |
| 2007/0157281 | A1 | 7/2007 | Ellis et al. |
| 2007/0204308 | A1 | 8/2007 | Nicholas et al. |
| 2008/0140406 | A1 | 6/2008 | Burazerovic et al. |
| 2008/0141303 | A1 | 6/2008 | Walker et al. |
| 2011/0107220 | A1 | 5/2011 | Perlman |

FOREIGN PATENT DOCUMENTS

| | | |
|---|---|---|
| GB | 2405018 | 2/2005 |
| KR | 20040034891 | 4/2004 |
| WO | 01/46818 | 6/2001 |
| WO | 02/19701 | 3/2002 |
| WO | 02/102079 | 12/2002 |
| WO | 2005/003899 | 1/2005 |
| WO | 2006/012788 | 2/2006 |

OTHER PUBLICATIONS

"AINGR: Switching Systems," Telcordia Technologies Generic Requirements GR-1298-CORE, Issue 7, pp. 1-988, Nov. 2001.

"AINGR: Switching Systems," Telcordia Technologies Generic Requirements GR-1298-CORE, Issue 7, pp. 989-2093, Nov. 2001.

"Alternative Web Browsing," Web Accessibility Initiative (W3C), http://www.w3.org/WAI/References/Browsing.html, four pages, Oct. 25, 2005.

"Audio Descriptions," EABNET, four pages, http://www.eabnet.org.uk/knowitall/finally/teabreak/newsletters/April/April2004.htm, Apr. 2004.

BBC, Channel 4 and ITV to Extend Audio Description Service, BBC Press Release, two pages, http://www.bbc.co.uk/pressoffice/pressreleases/stories/2004/06_june21/audio.shtml, Jun. 21, 2004.

"Comcast and Microsoft Announce Agreement to Trial Microsoft TV Software," Microsoft TV Press Release, three pages, http://www.microsoft.com/tv/content/PressReleases/MSTVComcastPR.mspx, Jul. 21, 2003.

"Digital Photo Viewer," TiVo, Inc., www.tivo.com/4.9.5.asp, one page, retrieved from the internet on Aug. 16, 2005.

"Fantasy Sports is Our Undiscovered Game," The Next Level, http://www.electronicgamingbusiness.com, one page, Jul. 28, 2004.

"Fantasy Sports Trade Association (FSTA), Latest News: Aug. 26, 2005," http://www.fsta.org/index.shtml, one page, Aug. 26, 2005.

"Five to Use BSkyB's Audio Description Technology," British Sky Broadcasting Group Press Release, two pages, http://www1.sky.com/disability/release2.htm, Nov. 18, 2003.

"Honda Interactive TV Campaign to Explain New IMA Technology," Press Release, E-consultancy.com, three pages, http://www.e-consultancy.com/about/press.asp?id=166, Apr. 27, 2004.

"Instant Messaging and Presence SIP Showcase," SIP Center, http://www.sipcenter.com/sip.nsf/html/Instant+Messaging+and+Presence, two pages, Oct. 27, 2005.

"Interactive TV Stuck in Zip?," MediaWeek, four pages, http://www.brandrepublic.com/news/516492/, Jul. 20, 2004.

"Kodak EasyShare Gallery, Tell Your Story. Share Your Photos," Kodak Imaging Network, Inc., one page, Copyright 2005.

"Microsoft TV Photo Viewer Provides a Simple New Way to View Digital Photos on Home Television Sets," Microsoft Corporation, www.microsoft.com/presspass/features/2001/sep01/09-20tvphotoviewer.mspx, two pages, Sep. 20, 2001.

(56) References Cited

OTHER PUBLICATIONS

"Netgem i-Player AD," Netgem Direct, http://www.netgemdirect.com/default.asp?action=produit.and.id_prod=5, one page, retrieved from the Internet on Jul. 6, 2005.
"Snapfish, Big News! 12¢ Prints!," Snapfish UK., one page, retrieved from the internet on Aug. 16, 2005.
"The American Heritage College Dictionary," Fourth Edition, Houghton Mifflin Company, p. 842, Copyright 2002.
"TV for the Blind—New Audio Description Tool Changes TV Experience," Netgem Press Release, two pages, http://www.netgemdirect.com/files/homepage/tvfortheblind, Jan. 13, 2004.
"Welcome to the Honda Multimedia," Honda UK, http://www.honda.co.uk/multimedia/ one page, retrieved from the internet on Aug. 25, 2005.
"Wink Communications Launching Interactive TV Commercials," ClickZ News, www.clickz.com/news/article/pp/16761, four pages, Jan. 25, 1999.
"Yahoo! Photos, Share Your Photos with the People Who Matter," http://photos.yahoo.com, one page, Copyright 2005.
"Zip TV Channel Launches with Exclusive Honda Video," Zip Television, Press Release, www.immediatefuture.co.uk/296, 24 pages Jun. 7, 2004.
"Zip TV Debuts with Interactive Content for Honda Campaign," American International Automobile Dealers Association (AIADA), http://www.aiada.org/article.asp?id=20603, two pages, Jul. 29, 2005.
Arthur, "It's Fantasy-astic: Fantasy Football Has Become a Monster in North America, Which Explains My Sudden Interest in Guys Named Morten," National Post, Toronto Edition, p. S2, Sep. 27, 2004.
Battelle, "#4: That Wonderful Honda Ad," Business 2.0 Media Inc., http://battellemedia.com/archives/000137.php, one page, Dec. 15, 2003.
Batts, "Sports Fans Become CEOs in Multibillion-Dollar Fantasy Leagues," Knight Ridder/Tribune Business Review, Virginian-Pilot, four pages, Sep. 26, 2004.
Chorianopoulos, "Content-Enriched Communication—Supporting the Social Uses of TV," XP001507678, The Journal of the Communications Network, vol. 6, Part 1, pp. 23-29, Jan.-Mar. 2007., Jan. 7, 2007.
Delaney, "Fantasy Sports Lures AOL, Electronic Arts as More Fans Join In," Wall Street Journal, p. B1, (three pages), Sep. 9, 2004.
Graefen, "Mit Samba Wird aus Linux ein Stabiler Windows Datei- und Druckserver," XP-000846989, NTZ, vol. 52, No. 6, pp. 32-33, Jan. 1999., Jan. 1, 1999.
Handley, et al., "SIP: Session Initiation Protocol, RFC 2543," Network Working Group, The Internet Society, 131 pages, Mar. 1999.
Hoffarth, "Fantasy Football is TV's Reality," The Daily News of Los Angeles, p. S2 (three pages), Sep. 10, 2004.
Hurtt, "Get in the Game: Think You Know Football? Put it to Use. Fantasy Leagues Have Something to Offer Every Fan, Even Old-Schoolers," The Sporting News, five pages, Aug. 30, 2004.
Kessler, "Hot Players in Online Gaming," Business Week Online, http://www.businessweek.com/investor/content/may2004/pi20040524_2927_pi044.htm, four pages, May 24, 2004.
Kingsford-Smith, "Interactive TV Advertising: Turning Viewers Into Direct Leads Without a Set-Top Box," Broadcastpapers.com http://www.broadcastpapers.com/data/IKSInteractiveTV02.htm, four pages, Sep. 24, 2003.
Levy, "The Teams Aren't Real, but Money Is: Fantasy Sports Have Caught Corporations' Attention," Minneapolis Star Tribune, p. 1A (three pages), Aug. 29, 2004.
Michael, et al., "Instant Messaging," Call Center, http://www.cconvergence.com/GLOBAL/stg/commweb_shared/shared/article/showArticle.jhtml?articleId=8700996.and.pgno=1, four pages, Jan. 5, 2001.
Regan et al., "Media Center Buddies: Instant Messaging Around a Media Center," Technical Report MSR-TR-2004-47, Microsoft Research, http://research.microsoft.com/research/pubs/view.aspx?type=Technical%20Report&id=751, pp. 1-9, Jun. 2, 2004.
Rosenberg, "A Presence Event Package for the Session Initiation Protocol (SIP)—RFC 3856," Network Working Group, The Internet Society, 25 pages, Aug. 2004.
Speir, "Screen Readers Open Windows for the Blind," FCW.com, http://www.fcw.com/fcw/articles/2000/0807/cov-access3-08-07-00.asp, three pages, Aug. 7, 2000.
Sugano, et al., "Presence Information Data Format (PIDF), RFC 3863," Network Working Group, The Internet Society, 31 pages, Aug. 2004.
Tedeschi, "Advertisers Discover the Value of Young Men with Time and Money to Spend on Fantasy Sports on the Web," New York Times, p. C7 (three pages), Aug. 23, 2004.
Thawani et al., "Context Aware Personalized Ad Insertion in an Interactive TV Environment," Applied Research Group, Satyam Computer Services Limited, seven pages, http://www.di.unito.it/~liliana/TV04/FINAL/thawani.pdf, Copyright 2004.
Warley, "In the Spotlight, Sports iTV: The Sporting News," http://www.tvspy.com/nexttv/nexttvcolumn.cfm?t_nexttv_id=581.and.page=1.and.t_content_cat_id=10, five pages, Oct. 23, 2002.
Wendel "How Fantasy Games Have Changed Fans," USA Today, http://www.usatoday.com/news/opinion/editorials, three pages, Sep. 19, 2004.
Widmayer, "An Introduction to Screen Readers," five pages, http://web.archive.org/web/20040404135336/http://mason.gmu.edu/~swidmaye/portfolio/edit797assistivetech.htm, retrieved from the internet on Jul. 19, 2007.

* cited by examiner

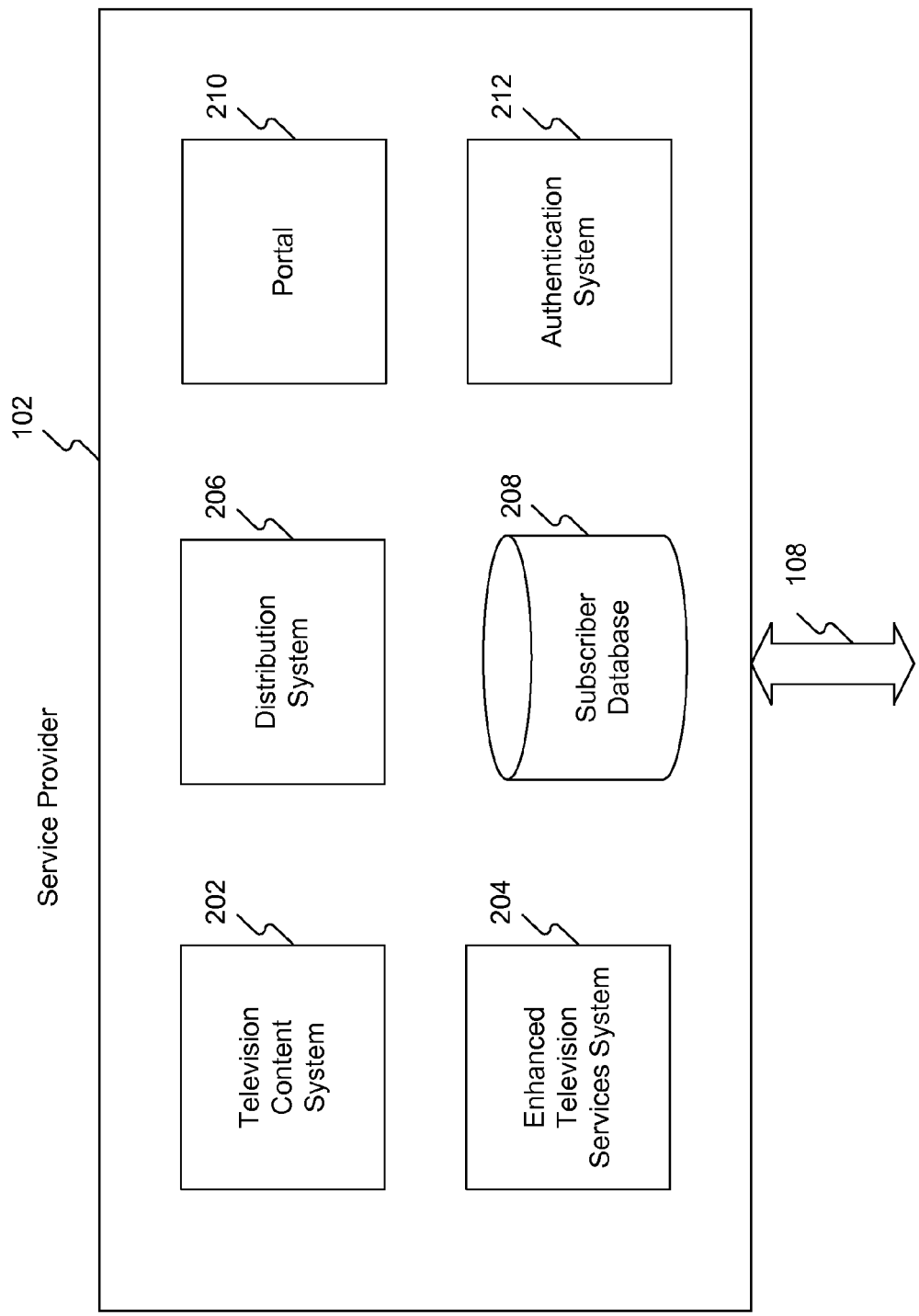

SYSTEMS AND METHODS FOR PROVIDING A SHARED FOLDER VIA TELEVISION

I. CROSS REFERENCE TO RELATED APPLICATIONS

This application is a continuation of U.S. patent application Ser. No. 11/356,092 filed on Feb. 17, 2006, the disclosure of which is incorporated herein by reference in its entirety.

II. RELATED APPLICATIONS

The applications listed below are related to this application and were filed on Feb. 17, 2006:
  U.S. patent application Ser. No. 11/356,090 entitled "Systems and Methods for Providing Supplementary Television Content;"
  U.S. patent application Ser. No. 11/356,053 entitled "Systems and Methods for Shared Viewing Via Television;"
  U.S. patent application Ser. No. 11/356,052 entitled "Systems and Methods for Fantasy League Service Via Television," now U.S. Pat. No. 8,584,174 issued on Nov. 12, 2013;
  U.S. patent application Ser. No. 11/356,056 entitled "Television Integrated Chat and Presence Systems and Methods," now U.S. Pat. No. 7,917,583 issued on Mar. 29, 2011;
  U.S. patent application Ser. No. 11/356,094 entitled "Systems and Methods for Providing a Personal Channel Via Television," published on Aug. 23, 2007 as U.S. Patent Application Publication 2007/0199019; and
  U.S. patent application Ser. No. 11/356,091 entitled "Systems and Methods for Voicing Text in an Interactive Programming Guide," now U.S. Pat. No. 8,522,276 issued on Aug. 27, 2013.

III. TECHNICAL FIELD

The present application is generally directed to communications networks having video transmission capabilities. The embodiments described herein are more specifically directed to systems and methods to receive and transmit enhanced television services over high bandwidth access networks, including shared folder services.

IV. BACKGROUND INFORMATION

Consumers and businesses today receive television services from a variety of sources. Using even the most basic television set, viewers can receive traditional television broadcasts via an antenna connected to the television set. The problems with traditional broadcast television are well known. To receive a television signal, the receiving antenna must be within the range of a broadcast transmitter, making it difficult to receive a signal in remote places. The quality of a broadcast picture can depend on the strength or position of the antenna, leading to fuzzy pictures and constant repositioning of the antenna. Furthermore, traditional broadcast television is limited to simple viewing. The television signal is received and a picture is displayed on the viewer's television. Aside from changing channels, there is no way for viewers to customize television content or to communicate with broadcasters.

Cable television and, later, satellite television were developed to solve some of the problems associated with traditional broadcast television. Cable television providers receive television content from a variety of programming sources and transmit the content via cables, such as coaxial cables, directly to subscribers' homes. In the home, a "set top box" is typically used to receive the cable signal and provide it to the televisions for display. Although cable television does not generally suffer from the picture quality problems of over-the-air broadcast television, the use of amplifiers to carry the cable signal over long distances can cause signal degradation and reliability problems. The typical cable set top box also offers limited options for customizing content because it relies on standard broadcast television content transmissions, has generally contained limited processing functionality and has limited network interactivity capabilities (e.g., pay-per-view requests, video on demand requests).

Satellite television provides high quality television picture because its signal travels through the air (i.e., a faster and more accurate delivery medium than cable) and it does not rely on an antenna's range to the content provider. Instead, satellite providers broadcast television content to a geosynchronous satellite that rebroadcasts the content to a satellite dish at a subscriber's home. The satellite dish is typically connected to a satellite receiver that decrypts and formats the television content and delivers it to the televisions for display. However, satellite television is not without its limitations. For example, like cable television services, satellite television relies on standard broadcast content transmissions. Furthermore, satellite receivers rely on low-bandwidth conventional "plain old telephone service" (POTS) telephone lines to provide a bi-directional communication path for requests from the satellite receiver and download of customized content, so download rates are slow and available content is limited.

Digital video recorders, available as standalone components or integrated in set top boxes and satellite receivers, enable viewers to record television content. Using a menu displayed on the television, viewers may be able to select programs to be recorded, order pay-per-view content, and set viewing preferences, such as parental controls. However, typical digital video recorders use low-bandwidth POTS phone lines as a bi-directional communication path to a cable, satellite or other service provider, limiting the ability to provide any content customized specifically for a particular user.

Over the years, broadcast, cable, and satellite television have steadily improved television picture quality and some providers have developed the capacity to deliver limited enhancements to video broadcast viewing, such as pay-per-view and video-on-demand. Digital video recorders enable viewers to receive content in a limited and delayed fashion. However, there remains a need for enhanced television services that are rich, reliable, and truly customized.

V. BRIEF DESCRIPTION OF THE DRAWINGS

FIG. 2 is a detailed block diagram of a service provider consistent with an embodiment of the present invention;

Figure 3A:
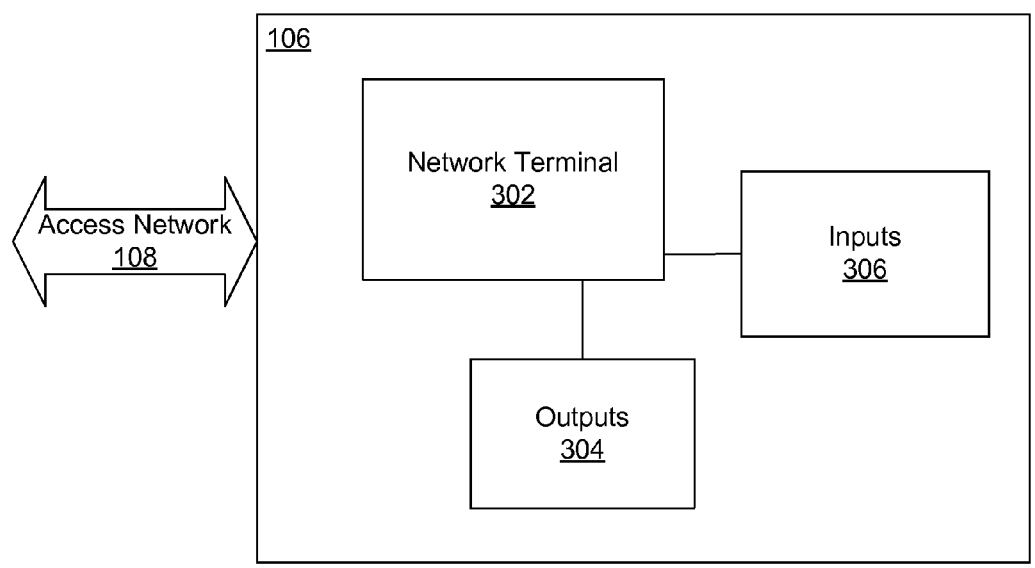
Figure 3B:
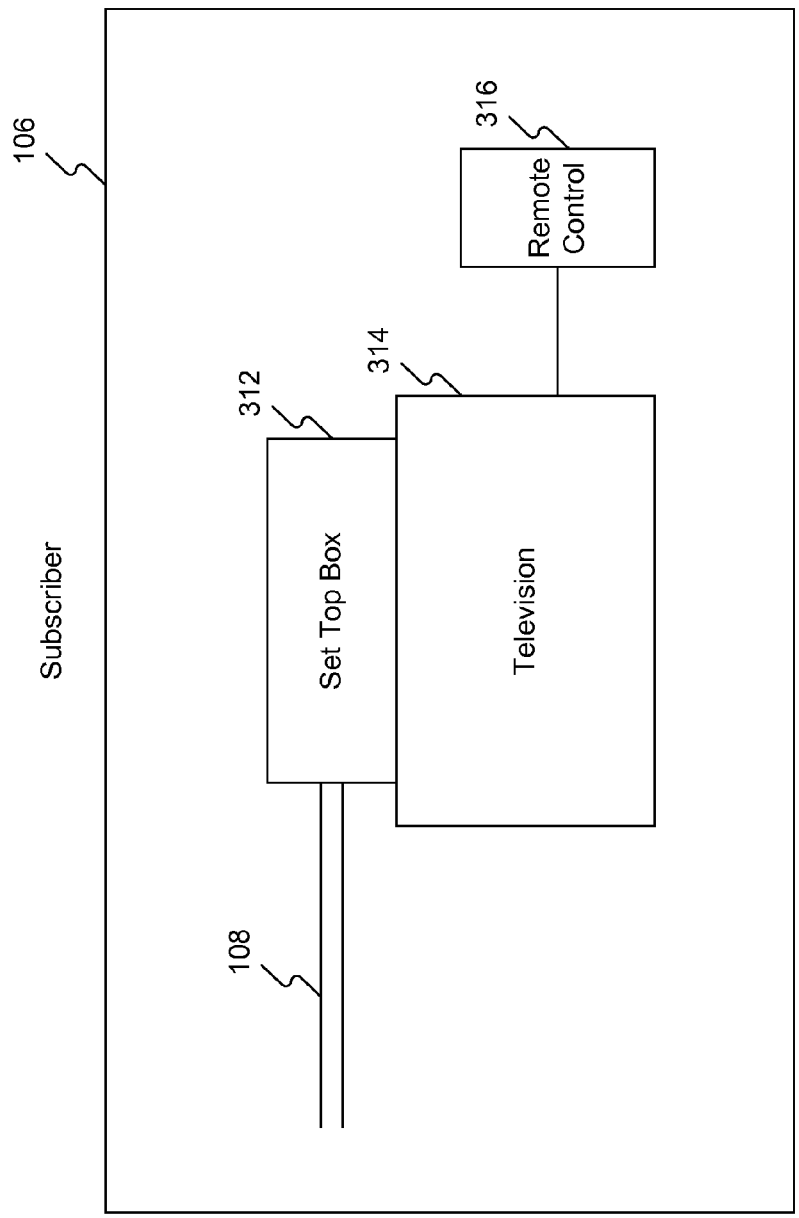
Figure 4:
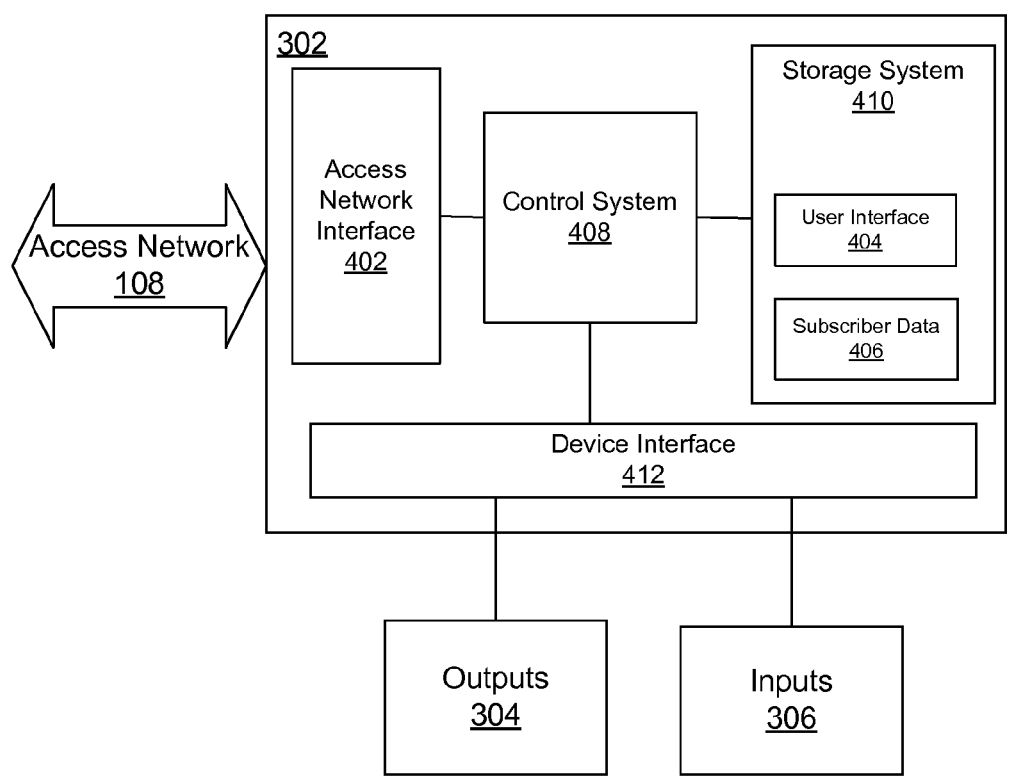
Figure 5:
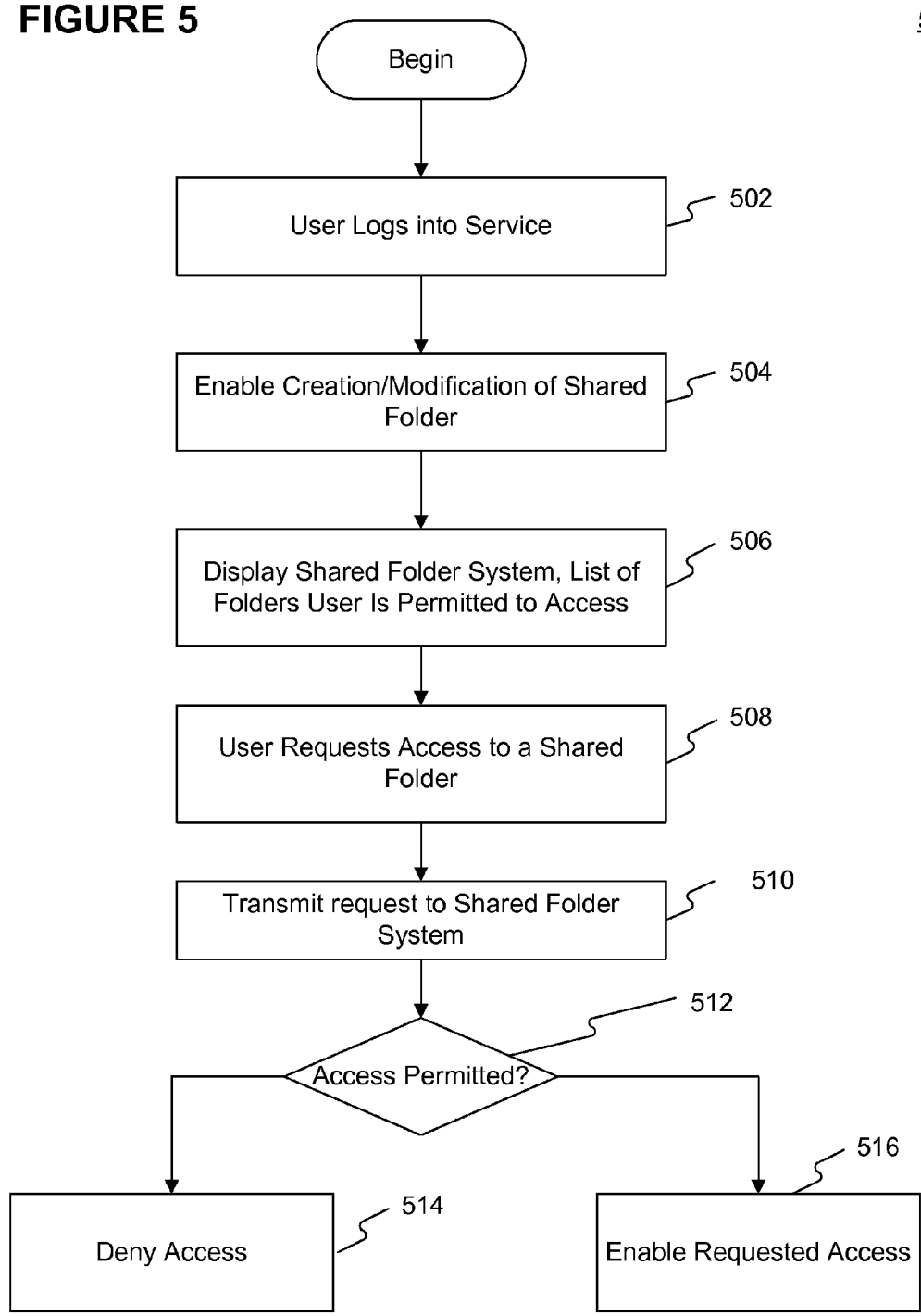
Figure 6:
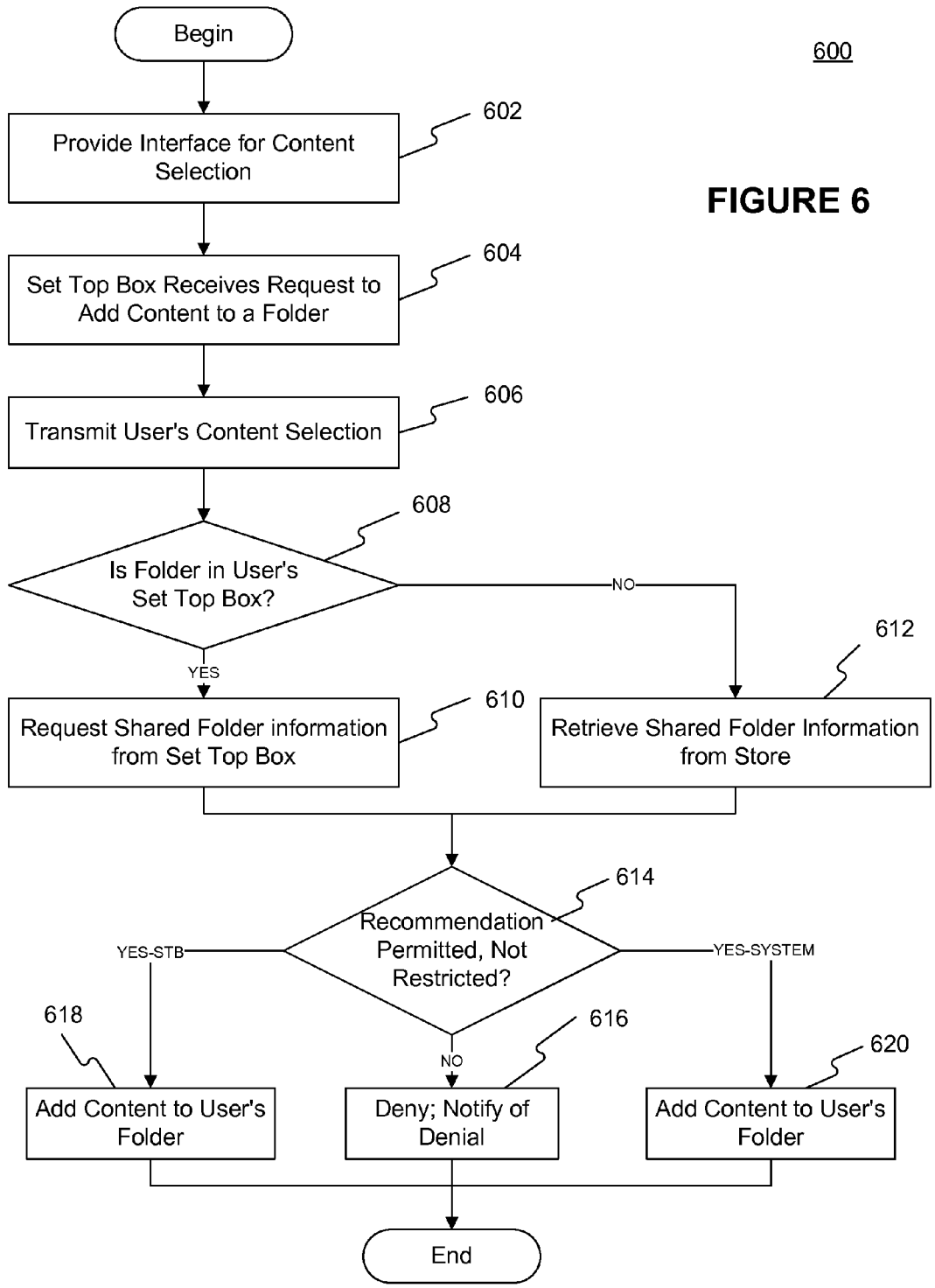
Figure 7:
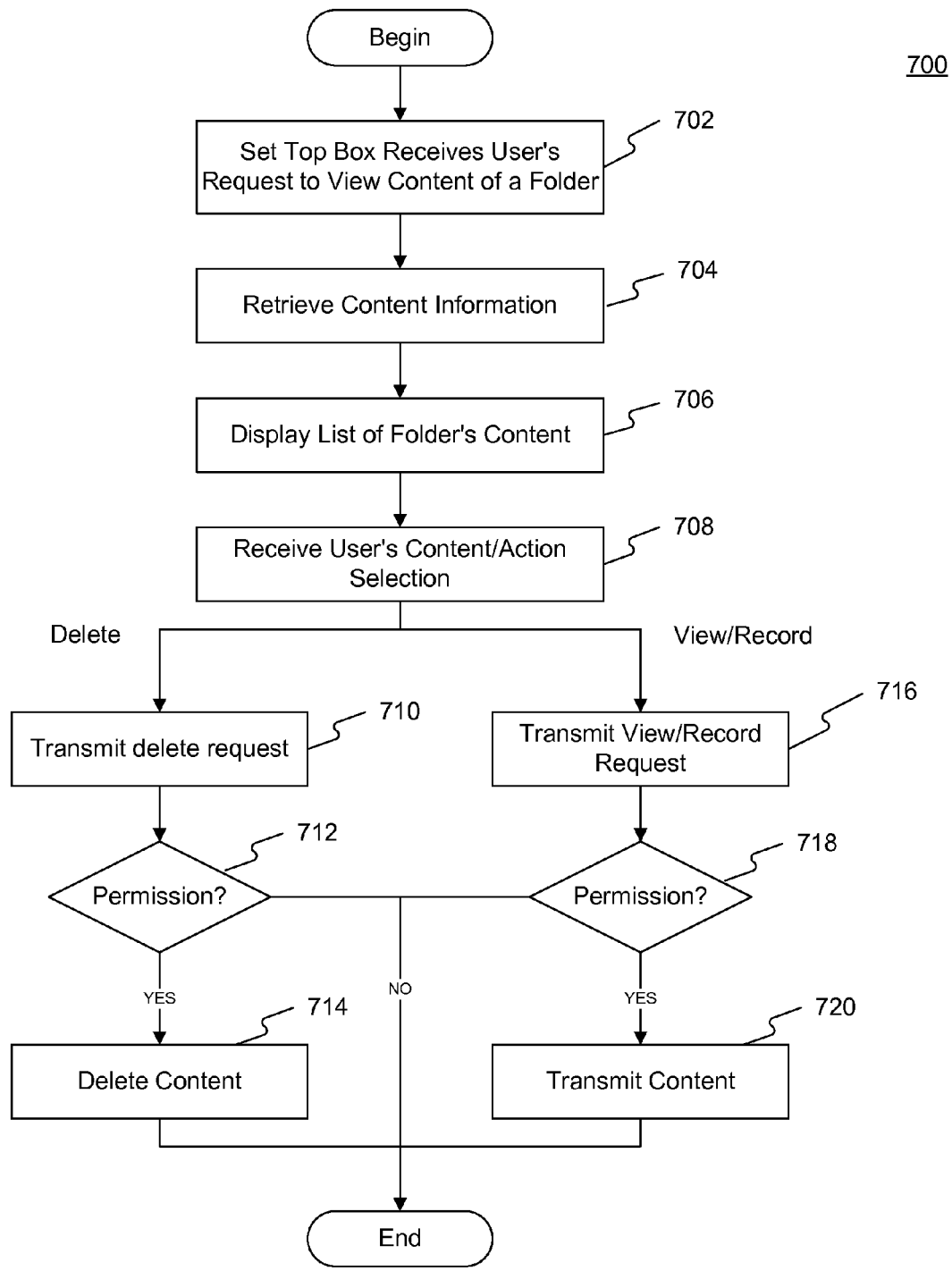
Figure 8:
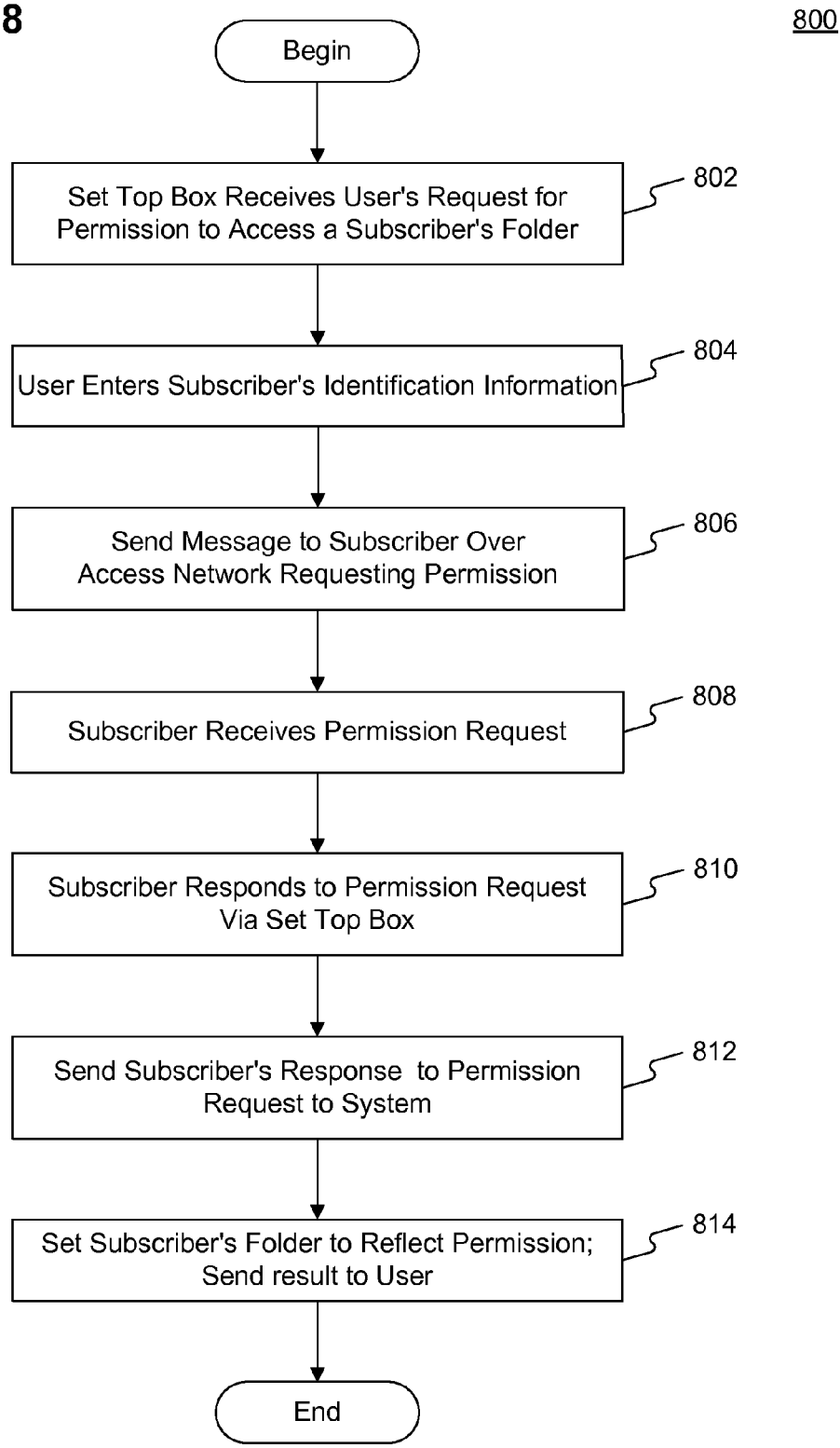
Figure 9A:
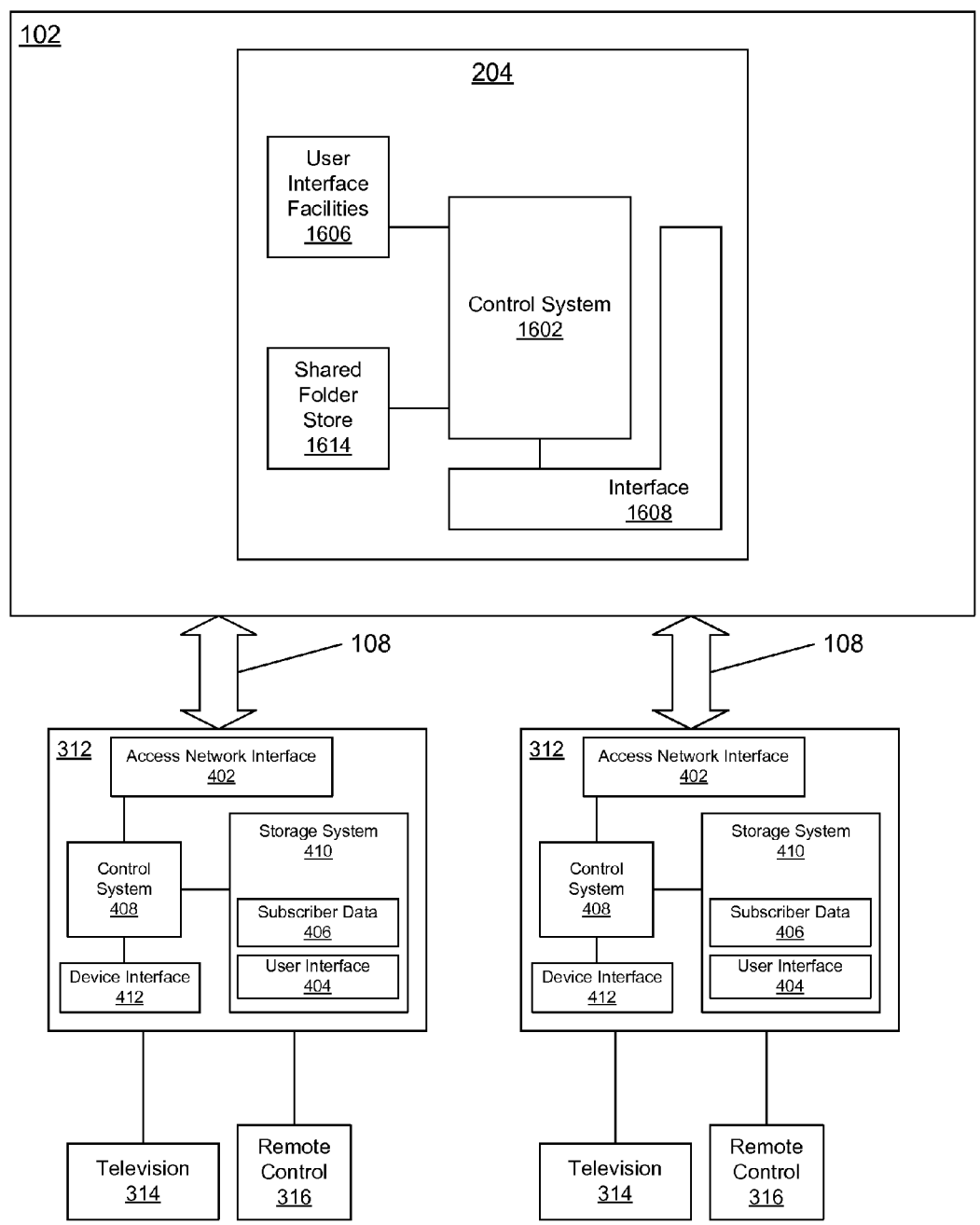
Figure 9B:
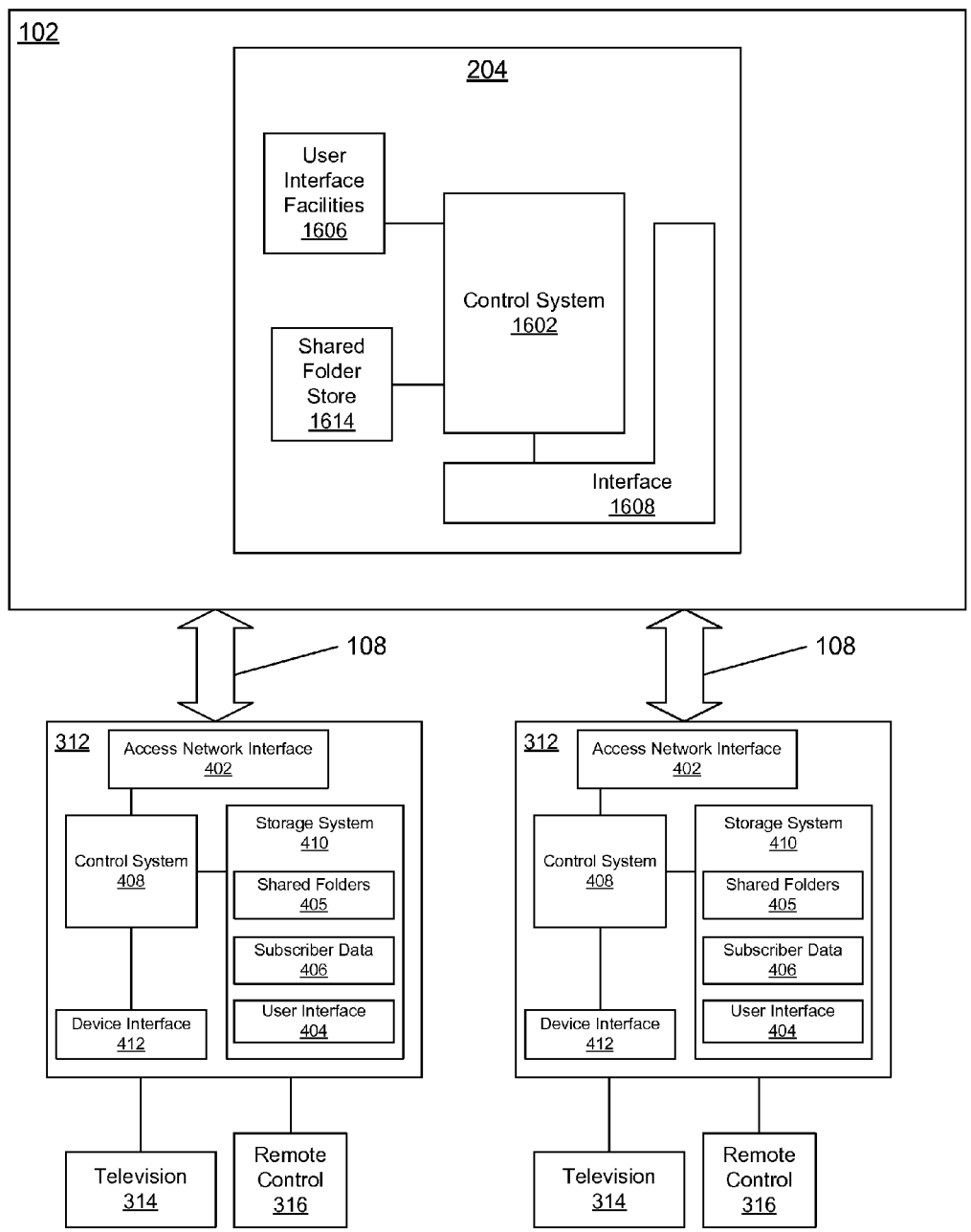

FIGS. 3(a) and 3(b) are detailed block diagrams of a subscriber, consistent with an embodiment of the present invention;

FIG. 4 is a detailed block diagram of a network terminal consistent with an embodiment of the present invention;

FIG. 5 depicts a flow chart of an exemplary process for use of a shared folder system in a manner consistent with an embodiment of the present invention;

FIG. 6 depict a flow chart of an exemplary method for sending content to a shared folder consistent with an embodiment of the present invention;

FIG. 7 is a flow chart of an exemplary method for using a shared folder via television consistent with an embodiment of the present invention;

FIG. 8 is flow chart of an exemplary method for obtaining access permissions to a user's shared folder consistent with an embodiment of the present invention; and FIGS. 9(a) and 9(b) are block diagrams of a system used in implementing a shared folder system, consistent with an embodiment of the present invention.

VI. DETAILED DESCRIPTION OF PREFERRED EMBODIMENTS

Preferred methods and systems consistent with the present invention provide enhanced television services to subscribers using a high speed bi-directional connection such as a fiber optic network. A service provider transmits both general television content, such as broadcast television programs, and content that is customized for each subscriber. Subscribers communicate with the service provider to perform any number of tasks, including establishing an account, ordering customized content, and sharing content with other subscribers.

Reference will now be made in detail to various exemplary embodiments implemented according to the invention, examples of which are illustrated in the accompanying drawings. Wherever possible, the same reference numbers will be used throughout the drawings to refer to the same or like parts.

A. System Overview

Figure 1:
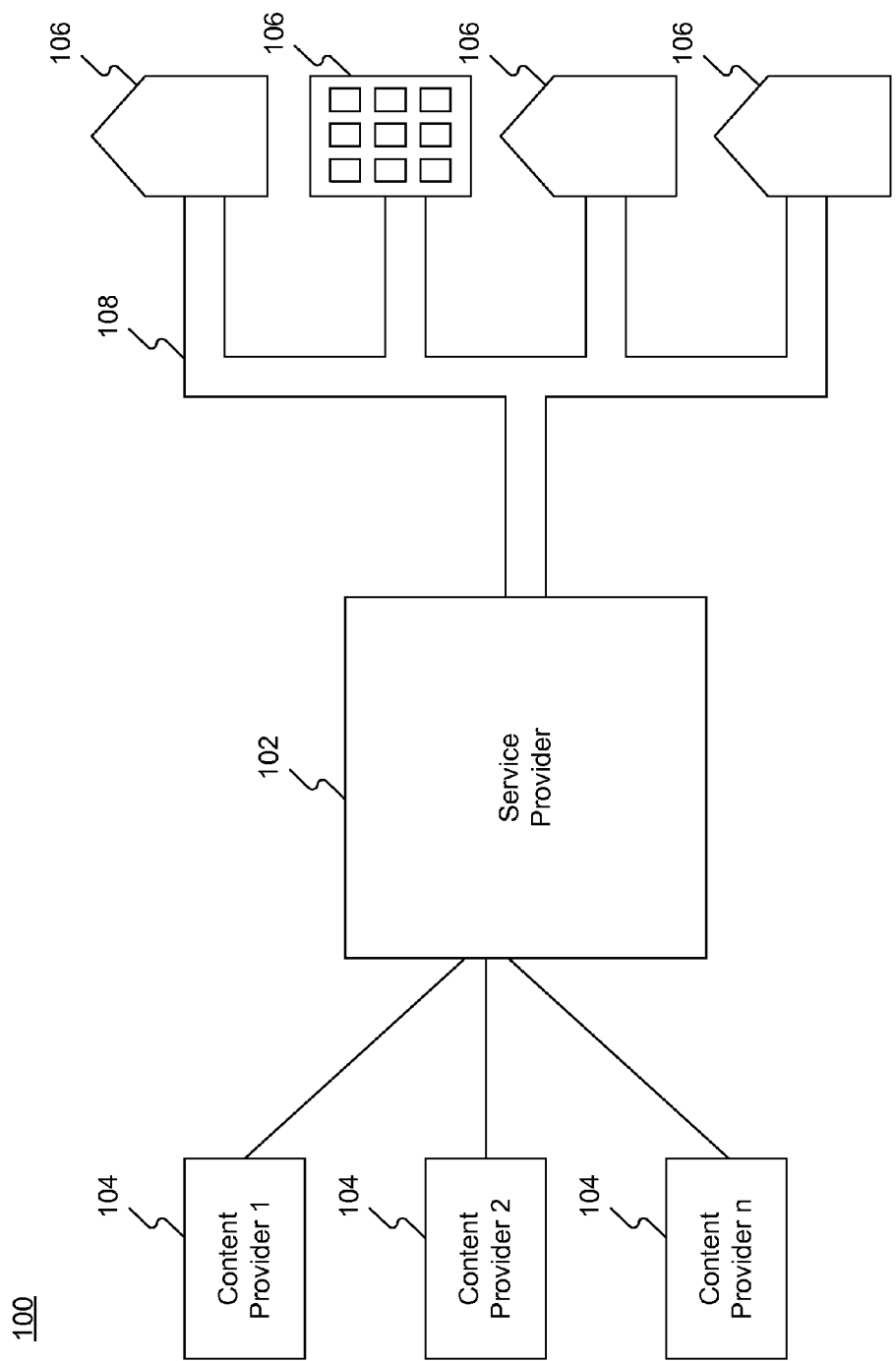
FIG. 1 is a block diagram of a system consistent with an embodiment of the present invention.

FIG. 1 is a block diagram of a system 100 consistent with a preferred embodiment of the present invention. A service provider 102 collects content (e.g., broadcast video, broadcast audio, audio/video on demand, data content), from a plurality of content providers 104. Such content may include, for example, programming from local broadcast television channels, programming from national broadcast television content providers such as Home Box Office or ESPN, and educational programming such as distance learning broadcasts. Service provider 102 transmits data, including the audio/video content, to subscribers 106 via an access network 108. Subscribers 106 may include homes, businesses, hotels, etc. In a preferred embodiment, access network 108 consists mainly of fiber optic cables and connectors, enabling high speed, two-way communication between service provider 102 and subscribers 106. Access network 108 may also include other networking technologies, such as wireless networking. In one embodiment, service provider 102 and subscribers 106 may also be able to communicate via alternate networks that may interconnect the service provider 102 and subscribers 106, such as the Internet (not shown).

FIG. 2 is a block diagram of a service provider 102 consistent with a preferred embodiment of the present invention. Service provider 102 may provide multiple services to subscribers 106. For example, service provider 102 may establish and maintain subscriber accounts, provide regular broadcast television programming, provide on-demand video content, enable subscriber feedback, etc. Service provider 102 may also enable subscribers 106 to obtain enhanced services, such as described below.

Exemplary service provider 102 may include various systems and facilities to receive, store, process and transmit content for provision to subscribers 106. For example, exemplary service provider 102 may include a television content system 202, an enhanced television services system 204, a distribution system 206, a subscriber database 208, a portal 210, and an authentication system 212. Television content system 202 may receive, store, process and transmit broadcast television content originated by content providers 104. In one embodiment, service provider 102 may also create television content and store and transmit such content using television content system 202. Enhanced television services system 204 may receive, store, process and transmit data to support enhanced television services and provide subscriber interfaces for accessing enhanced television services (as further discussed below).

Distribution system 206 may distribute content and data, e.g., from television content system 202 or enhanced television services system 204, to subscribers 106. Distribution system 206 may perform broadcast/multicast delivery (e.g., to send the same information to many subscribers simultaneously) or unicast delivery (e.g., to send customized content to a single subscriber). Distribution system 206 may also provide an "upstream" communications path from subscribers 106 to, for example, enhanced television services system 204, such that subscribers may send requests and other information related to obtaining customized content, among other things.

Subscriber database 208 may store data about subscribers 106 such as name, address, subscriptions to enhanced services, etc. Portal 210 may provide an interface for communications with service provider 102 via an external network, such as the public switched telephone network (PSTN) or a wide area network such as the Internet. Authentication system 212 may process authentication and/or authorization information to enforce security and privacy for providing services to subscribers 106.

A skilled artisan will recognize that service provider 102 may include more or fewer components than are shown in FIG. 2, and more or combined functionality compared to that illustrated in FIG. 2. For example, a separate database may be provided to store authentication information used by authentication system 212. In another example, service provider 102 may include telecommunications and/or conference bridge facilities to enable subscribers 106 to access audio/video telecommunications and/or teleconference services (e.g., available through enhanced television services). Additionally, the functionality of service provider 102 may be performed by a single system, or by a combination of computers and other equipment, which may be distributed over multiple locations and interconnected by various communications links. The operation of the components of service provider 102 is described in greater detail below.

FIGS. 3(a) and 3(b) illustrate block diagrams of a subscriber 106 consistent with a preferred embodiment of the present invention. As shown in FIG. 3(a), subscriber 106 receives transmissions from service provider 102 via access network 108 at a network terminal 302. As described above, access network 108 may be, for example, a passive optical network (PON). The network terminal 302 may receive the network transmissions from service provider 102 via any number of intermediate components/technologies. For example, an optical-to-electrical conversion component may be interposed between the network terminal 302 and service provider 102 in order to convert optical transmissions to electrical signals (e.g., RF signals, POTS signals, Ethernet signals), as well as other transport components that may be deployed therebetween.

Network terminal 302 processes data received via access network 108 and presents it to output devices 304. As such, network terminal 302 may include processors, storage systems, network interfaces (e.g., to access network 108) and device interfaces, as generally known. Output devices 304 can include any number of components with the capabilities to output audio and/or video, such as video displays, speakers, television sets, etc. Network terminal 302 is also connected to one or more input devices 306, which allow users to provide input data, for example, to control the network terminal 302 or output devices 304, or provide data for upstream transmission over access network 108. Input devices 306 can include devices such as keyboards, pointing devices, remote controllers, touch screens, etc. In certain embodiments, network terminal 302 may be integrated with any or all of the output devices 304, as well as any or all of the input devices 306 (an example of which would be a mobile telephone). In some embodiments, subscriber 106 may also use a separate computing system or telecommunications device such as a telephone (not shown) connected to an external network (e.g., PSTN, Internet, wireless network) to communicate with service provider 102 (e.g., via portal 210).

FIG. 3(b) illustrates a specific embodiment relative to typical television service at a subscriber 106. As shown in FIG. 3(b), the network terminal is a set top box 312 connected to access network 108 (e.g., via various technologies/components) to communicate with service provider 102. Set top box 312 is connected to television 314, which includes facilities to display video and produce audio based on signals provided by set-top box 312. A remote control 316 and other input devices (e.g., pushbuttons) are provided and may be communicatively connected to television 314 and/or set-top box 312 (e.g., wirelessly) to enable a viewer to control television 314 and/or set top box 312, and to provide data which may be transmitted over access network 108 to service provider 102, and/or other subscribers 106.

Subscriber 106 may set up an account with service provider 102 which enables and/or controls the ability to receive enhanced television services. For example, the subscriber account may be used by provider 102 to store subscriber identification information, such as a name and address, store indications of which services a subscriber is authorized to receive, such as premium broadcast channels or Internet access, and track and bill for enhanced services, such as viewing of personalized content, etc. The account may also store an identifier of the subscriber's network terminal 302 that allows for identification of the network terminal over the access network 108 (e.g., a unique identifier of a set top box 312 assigned to the subscriber), facilitating the delivery of enhanced television services to the subscriber. Subscriber 106 may access account information, for example, using portal 210 via voice communications (e.g., an interactive voice response system) or data communications (e.g., an interactive web interface over the Internet). Alternatively, a subscriber may use a phone integrated into set top box 312 or controls available in remote control 316 to communicate with service provider 102 over access network 108.

Subscriber 106 may include several users and their equipment. For example, within a single household, different family members may desire to receive different content or subscribe to different enhanced television services from service provider 102. In one embodiment, a subscriber 106 (e.g., a household) may establish an account with service provider 102 and each user (e.g., family members in the household) is associated with that account and may have information stored in subscriber database 208. In another embodiment, each user may establish his own account with service provider 102.

FIG. 4 is a detailed block diagram of a preferred network terminal 302 (such as set top box 312). Network terminal 302 may include an access network interface 402, control system 408, storage system 410 and device interface 412. Control system 408 may include processors or other control logic, which may be used to execute various instructions and manipulate data stored in storage system 410. Storage system 410 may include various storage devices and controllers, such as semiconductor memories (e.g. RAM, ROM, flash), magnetic memories (e.g., disk), optical memories (e.g., DVDs), memory controllers and/or other storage, as is well known. Device interfaces 412 may include various components to interface with external components, such as output devices 304 and input devices 306, as generally known.

Using the access network interface 402, network terminal 302 communicates with service provider 102 to send and receive high-speed communications for television programming, enhanced television services, subscriber account management, etc., over access network 108. Access network interface 402 may include various components to allow for communications over access network 108 in one or more forms, depending on the implementation. For example, access network interface 108 may include an RF interface to receive RF signals and/or an optical interface to receive optical signals. Access network interface 402 may further include components to distinguish between and process various communications carried over access network 108. For example, access network interface 402 may include components to receive broadcast-television-formatted transmissions (e.g., NTSC, MPEG) and/or packet-data-formatted transmissions (e.g., Ethernet, IP). In some embodiments, access network interface 402 may also be connected to device interface 412, for example, to provide broadcast television transmissions to output devices 304.

Storage system 410 may include various modules executable by the control system 408 and implementing various features in preferred embodiments. For example, storage system 410 stores a user interface 404 comprising one or more displays (e.g., an interactive program guide) which may be provided on output devices 304 to enable subscriber 106 to communicate with network terminal 302, select content for viewing, access enhanced viewing features, etc. User interface 404 may include various user interfaces to utilize enhanced television services available through service provider 102, for example, downloaded from service provider 102. Subscriber data 406 may also be stored in storage system 410 to support enhanced television services. For example, a subscriber's viewing preferences or settings may be stored as subscriber data 406. In another example, subscriber data 406 may be stored outside network terminal 302, such as at service provider 102 (e.g., in subscriber database 208) or on a computing system or other device controlled by the subscriber (e.g., a smart card).

Network terminal 302 may include fewer or more components than are shown in FIG. 4, as is well known, and may be interconnected in various ways using buses, etc., as is well known.

B. Enhanced Television Services

Preferred embodiments use a high-bandwidth bi-directional access network 108 to provide enhanced television services. For example, a service provider may provide a multitude of enhanced services to a subscriber by allowing the subscriber to connect with the service provider via such a high-bandwidth bi-directional access network to obtain, configure and control the delivery of desired television content and related services. A preferred embodiment utilizes a fiber optic access network, although other high-bandwidth technologies could also be used (e.g., RF wireless, RF over coaxial cables). Fiber optic connections provide much more bandwidth for transmitting data than conventional connections using radio waves or coaxial cable. Fiber, for example, can easily carry hundreds or even thousands of channels of television content, telephone services, and data services (e.g., Internet access). To leverage the additional bandwidth and quality of fiber connections, service providers may offer a wide range of enhanced television services to attract and retain subscribers.

Enhanced television services may include, for example, personalized television channels, synchronized sharing of personal content among subscribers, direct access to supplemental television content, integrated chat and presence information on television, and interactive entertainment. Subscribers may enjoy these services from their premises using familiar devices (e.g., a set-top box, a television, a remote control, etc.). In some embodiments, subscribers may have the option of using a computer or other device connected to the Internet to further customize or enhance television services.

C. Shared Folders

One enhanced television service that may be provided by systems and methods implementing the preferred embodiments is a "shared folder" service accessible via television. This service enables users, the service provider and/or trusted sources (such as friends or third party entities with appropriate permissions), to share use of a personal program folder via television. In one embodiment of this service, a user may provide content, such as a television program, to other geographically dispersed subscribers, by sending the content to the subscribers' shared folder. In another embodiment, the shared folder via television service also enables a user to create a personal content guide for use instead of a standard program guide that contains identical listings for all subscribers. Unlike standard program guides, a personal content guide shared folder may contain programs from a variety of channels and may be populated by the user, friends, and other trusted content providers. Furthermore, unlike standard program guides, users may delete or edit listings from the shared content folder. In another embodiment, the service also enables users to search for content using matching search criteria, such as searches for cartoons, shows with "Oprah" in the description, or talk shows. The content of the folder may include not only program listings resembling standard program guide listings, but also other content such as movies, television shows, web sites, photos, etc. A listing in the shared folder may include, for example, a show's title, the time and date the show will air, and the channel.

By using the bi-directional access network and attached network terminals, users can recommend programs or other high-bandwidth content such as videos, movies or pictures, to other users, or view the shared content of other users in remote locations, a service that is impractical in conventional television systems. Familiar devices such as televisions, set-top boxes and remote controls make accessing a shared folder possible for those without access to a computer or specialized software.

In one example use of a sharing service, a user may scan an onscreen program guide and see a show the user would like to recommend to a friend. From a series of menu options displayed by the interactive programming guide on the television, the user can select the show to recommend to a friend. The service provider receiving this recommended content from the user may authenticate the user and/or friend and transmit the recommended content to the friend's shared content folder, as specified by the user. When the friend turns on his television, the system may provide a notification showing a new recommendation from the user. The friend may use the notification to view the recommended content in the shared folder. If program content has not yet been broadcast, the friend may set a recorder to record the recommended content at the program time and date.

In another example use of a sharing service, a user may wish to use a shared folder as a means of providing parental supervision for television viewing. This might be the case, for example, for a parent who wishes to control the programs viewable by a child. To do this, the user may select a menu option to create a shared folder for the child's use. The user may select an option to search for content matching certain criteria to be added to the shared folder. For example, the user or owner of the folder, which is the parent in this example, may search for "cartoons" and may selectively add the search result to the folder. The user may also upload other content such as movies, pictures, or videos, to the folder. The parent may set the network terminal to display only the content of the shared folder when turned on, unless a password or a pin is entered. As such, when the child (or anyone else) turns on the television, they can select any of the listed programs or content in the folder, but cannot select or view other channels or content, such as the standard program guide, video-on-demand, recorded programs, etc.

FIGS. 9(a) and 9(b) illustrate block diagrams of an exemplary system that may be used in implementing a preferred shared folder service. The exemplary system is implemented using set top boxes 312 as network terminals 302 connected to access network 108. As noted above, in other implementations, other network terminals 302 may also be used. Shared folder service is facilitated by enhanced television system 204, which provides control system 1602, shared folder store 1614, user interface facility 1606 and network interface 1608. Control system 1602 may execute the methods and processes used to implement the features of the shared folder service as described herein, and may be implemented in one or more of software, hardware and firmware, using known processing systems, storage systems and interfacing systems, as is generally known. Shared folder store 1614 provides a storage location for shared folder information associated with particular subscribers 106, such as program content, program guide content, subscriber information (e.g., information to correlate the shared folder to a particular subscriber), an access control list for other subscribers that may access the shared folder, etc. (and may be dependent on the particular implementation, as noted below), and may be accessible by control system 1602. Shared folder store 1614 may be within system 204 (e.g., within control system 1602), or may be external to system 204 but accessible by system 204 (e.g., via network interface 1608).

User interface facility 1606 provides one or more user interfaces to permit a user to configure, control and view shared folder information. User interfaces may be implemented using known technologies, such as HTML or Java, and may be implemented as one or more modules that may be (completely or partially) downloaded to a subscriber's network terminal. Network interface 1608 provides an interface between enhanced television services system 204 and other components available via service provider 102. For example, a network interface 1608 may include an interface to distribution system 206 to permit the receipt/transmission of shared folder information and controls (e.g., user interfaces, subscriber commands/messages, content displays) over access network 108. Network interface 1608 may include interfaces to subscriber database 208 allowing for the retrieval of subscriber information stored therein and authentication system 212 allowing for authorization and authentication operations. Other interfaces may also be supported as desired (e.g., to portal 210 and television content system 202).

FIG. 9(*a*) illustrates a first exemplary implementation of the shared folder service. In this first implementation, system 204 provides shared folder store 1614 within system 204 (as shown), and shared folder information associated with particular subscribers 106 is stored therein. Subscribers are able to access their shared folders via communications with system 204, for example, using a set top box 312 connected to access network 108.

FIG. 9(*b*) illustrates a second exemplary implementation of the shared folder service. In this second implementation, in addition to the shared folder store 1614 of system 204, each set top box 312 includes a local shared folder store 405. The shared folder store 405 may be included within storage system 410 (as shown), or may be accessible to set-top box 312 via a device interface (e.g., an external memory device). Each shared folder store 405 may include shared folder information for the subscriber 106 associated with the set top box 312. Shared folder store 1614 may be used to store a subset of shared folder information associated with each shared folder locally stored in local shared folder store 405 (e.g., addressing information, access control lists), or may store a full version of each shared folder, in order to provide a master network version or a backup location. Other configurations are also feasible.

Multiple shared folders may be included in shared folder store 405/1614 associated with a single subscriber 106, for example, in the case where multiple household members use set-top box 312. In such a case, the shared folder information for each folder may include indications of which household member controls a folder (e.g., user ID information). Alternatively, all household members may have access to all shared folders associated with a subscriber.

FIG. 5 depicts a flow chart of an exemplary process 500 implementing the preferred shared folder service. In order to access enhanced television services (such as the shared folder service), a service provider may require that user log in to service provider 102 (step 502). The user may be, for example, one of subscribers 106 who is registered (e.g., in subscriber database 208) with service provider 102 to receive services, including enhanced television services. In this example, the user may log in by submitting a login name and password in response to a user interface that permits access to the shared folder service. Alternately, the user's set top box 312 may automatically provide a unique identifier associated with the set top box (e.g., on initial connection to access network 108). The authentication information may be received at service provider 102 via the access network 108 and checked against subscriber database 208 to determine whether the user is authorized to access the shared folder service.

Once logged in, a user interface may be provided that allows the user to create or modify a shared folder of the user (step 504). In the system of FIG. 9(*a*), this shared folder may be created within system 204, while in the system of FIG. 9(*b*), the shared folder may be created in set top box 312. Alternatively, service provider 102 may pre-create the shared folder, for example, along with an enhanced television service subscription or sale of set top box 312, and store the folder in set top box 312. The user interface may provide a list of the shared folders associated with the user, and associated shared folder information, such as the name given to the folder, its owner's user ID, access control lists, content controls, parental controls, etc. For example, some shared folder information may include content restrictions, such as the type of content the folder can contain, for example, "only cartoons" or "only PBS shows." Shared folder information may also include access permissions, for example, identities of other users that may access the folder and the type of access permitted. This may include a list of entities (e.g., friends) invited to send content to the folder or view the content of the folder. The user may also choose to prevent any other users from adding recommendations to the shared folder. In this way, the shared folder may behave as a personal reminder system for the owner of the shared folder. Parental controls may be used, for example, to cause the set top box 312 to use the shared folder. The user may use the interface to make changes to such share folder information as desired, and such changes may be stored in shared folder store 1614 (and/or shared folder store 405).

Set top box 312 may also display an interface that shows various shared folders accessible via system 204 on television 314 (step 506). This display may be limited to a list of shared folders the user can access (e.g., based on access permissions). The interface may also include different menu options the user can select in order to access facilities available by the shared folder system, such as "recommend program," "view folder," "send content," and "request access." The user interface may allow the user to request access to one or more of the displayed shared folders (step 508). In such an embodiment, the user requests access to one or more of the shared folders by, for example, selecting a particular folder from the display of folders and selecting a particular facility to invoke (e.g., "recommend program"). These selections may be accomplished using remote control 316, which then sends a message to system 204 over access network 108 including indications of the selected folder and facility (step 510).

Upon receipt of the message, system 204 may determine whether the user may use the requested facility on the selected folder (step 512). If not, the system may return a message to the set top box 312 indicating that the requested facility is not available to the user for the selected folder (step 514). If the requested facility is available to the user on the selected folder, the system 204 may then provide one or more messages to set top box 312 to facilitate use of the requested facility (step 516). For example, where a user wishes to recommend a program to friend subscriber 106, the user may select the friend's shared folder and the "recommend program" facility, and (if authorized) the system 204 will cause the set top box 312 to display interfaces that permit the selection of the program to be recommended and transmission of the recommendation the selected shared folder. The operation of exemplary facilities available to users of the shared folder system are described in greater detail below.

FIG. 6 depicts a flow chart of an exemplary method 600 for sending content information (such as a program recommendation) to a shared folder. In the embodiment shown, the set top box 312 provides various interfaces to allow a user to select content to add to a shared folder (step 602). The selection of content may be accomplished in various ways. For example, a program guide may be provided through user interface 404 of set top box 312, and a user who sees a program the user would like to recommend to a friend (for example, a new show on the civil war that will be broadcast next Thursday) may select an option to recommend the show from the user interface 404 (e.g., from the show's program guide listing), which may then cause the shared folder system interface to be displayed (see discussion of FIG. 5, above) for selection of the friend's shared folder. In another implementation, the set top box 312 may provide the shared folder interface, and the user may select the friend's shared folder and the facility to make a recommendation to the selected folder (which may then cause the program guide to be displayed for selection of the recommended program).

To select the program to recommend, a user may prefer to scan a list on a program guide as described above and/or scan shared folders, or the user may wish to search for content that matches certain criteria in a program guide and/or in shared folders. A search facility may be provided (e.g., as part of user interface 404, or as part of system 204) that allows the user to enter content criteria (e.g., "cartoons" or "shows with Oprah") and performs a search for content matching the criteria. The results may then be provided to the user, for example, in the form of one or more listing identifiers, which may be displayed in the user interface for selection by the user.

To select the shared folder(s) as destination(s) for the selected program recommendation, a user may prefer to scan a list of available shared folders (such as discussed with respect to FIG. 5), may prefer to search for a particular user or shared folder (for example, using a subscriber search interface provided by service provider 102), or may prefer to access stored contact information and use such contact information to determine the targeted shared folders for the recommendation. For example, set top box 312 may display a list of contacts (which may be stored locally at set top box 312 or within service provider 102), from which the user may select contacts to receive the program recommendation. This list may include, for example, friends that have given the user permission to write to their folders or recommend content to their folders. In the case of a business application, this list could be a list of users who have opted-in to receive recommendations such as programs, pictures or other content from the business entity.

In yet another implementation, the user may have an option to send actual content to the shared folder instead of, or in addition to, a listing of the program content. This may be limited by shared folder restrictions, for example, a folder owner may allow only listings of program content to be stored in a shared folder, and not the actual content. In such an implementation, an interface may be provided to retrieve such content from a specified source (e.g., an attached storage device, a network storage location, etc.).

Once the user has indicated the selections of content and targeted shared folder(s) via the provided user interfaces (step 604), set top box 312 may then transmit content information associated with such selections to system 204 over access network 108 (step 606). This content information may include indications of the underlying content selected—for example, in the case of a program recommendation, this could include identifiers indicating the identity of a program guide entry (e.g., time/date information) or a location of recorded content (e.g., memory location, file/directory name, set-top box identifier)—or it could include the actual program guide entry information or recorded content.

System 204 may then determine, for each shared folder to which the content information is to be provided, whether the shared folder is stored by system 204 in shared folder store 1614 and/or whether the shared folder is stored at the set top box 312 of the owner of the shared folder (e.g. in shared folder store 405) (step 608). If the folder is stored in the user's set top box 312, then system 204 may request shared folder information associated with the selected shared folder from the set top box 312, for example, any access control information and content restrictions (step 610). Alternatively, if the destination folder is stored with system 204, the shared folder information may be retrieved from shared folder store 1614 (step 612).

A validation process may be performed to ensure that the recommending user has the requisite permissions to store the content information in the shared folder and that the content being recommended meets any content restrictions applicable to the shared folder (step 614). If the validation process fails, a notification may be provided to the recommending user indicating the nature of the failure (e.g., content type restricted, no actual content permitted, no access permission, etc.) (step 616). If the content is validated, where the shared folder is stored on a set top box 312, the content information is provided to the set top box for inclusion in the shared folder (step 618). Where the shared folder is stored with system 204, the content information is stored in shared data store 1614 (step 620).

The exemplary method described above in relation to FIG. 6 may be modified to include or exclude various portions. For example, the system may be configured such that shared folders are automatically stored with system 204, and no location determination need be made. The method of FIG. 6 may also be configured such that, prior to adding a recommendation to a user's shared folder, system 204 may provide a message to the user indicating the content to be added and the user adding the content. In such an implementation, it may be required that the targeted user affirmatively respond to the message in order for the recommended content to be added to the user's shared folder. User interface 404 may include, for example, a "messages" section that alerts users when recommended content is added (or is requested to be added) to their shared folders, and may also include user alerts (e.g., screen pop-up windows). The messages may also be provided to the user via, for example, e-mail, instant message, regular mail, text message or other form of communication. Other modifications to the method as illustrated in FIG. 6 may also be made within the scope of the invention.

FIG. 7 is a flow chart of an exemplary method 700 for using a shared folder via television. As shown, a user may select to view the contents of a shared folder via a network terminal, such as set top box 312 (step 702). This might occur, for example, after the user selects a shared folder from a shared folder system display, indicating that the user would like to use the "view folder" facility (as noted above in FIG. 5). The shared folder display may include both shared folders of the user as well as shared folders of other subscribers, for example, who have allowed the user to access the shared folders. In one example, the folder may be owned by a local town and the content display may include the local town's news, weather information, pictures from town events, community programming etc.

Set top box 312 will then retrieve content information for the content associated with the shared folder (step 704). For example, where the shared folder is stored locally on the user's set top box 312, the set top box 312 may retrieve content information for content associated with the shared folder from shared folder store 405. Where the shared folder is stored with system 204 (e.g., in shared folder store 1614), the set top box 312 may request and receive the content information for content associated with the shared folder from system 204. Where the shared folder is stored on another subscriber's set top box, the user's set top box may retrieve information from the subscriber's set top box via access network 108.

Once the content information has been retrieved, the set top box 312 may display a list of the various content information stored in association with the shared folder (step 706). In some embodiments, users may be allowed to locate specific items of content from the displayed list using a search interface similar to that discussed above.

The user interface accompanying the display of the list of content may provide for access to various facilities available for the stored content, and the user may select a particular content item and facility via the user interface (step 708). For example, the user may be able to request to delete specific content stored in the folder. In response to such a request, the set top box 312 may transmit a message to system 204 indicating the content to be deleted (step 710). The system 204 may then check permissions to ensure that the delete operation can be performed by the requesting user on the selected folder (step 712), and where such permissions exist, will delete the content from the shared folder (step 714). For example, where the shared folder is stored with system 204 (e.g., in shared folder store 1614), the system 204 may modify the shared folder store 1614 to remove the content from the memory allocated to the shared folder. Where the shared folder is stored with a set-top box 312 (e.g., in shared folder store 405), the system 204 may issue a message to such set top box 312 instructing the set-top box 312 to delete the content.

Another exemplary facility that may be available to a user via the user interface is the ability to view and/or record specific content either stored in the folder or associated with content stored in the folder (e.g., in the case of a program listing) (step 708). In response to such a request, the set top box 312 may transmit a message to system 204 indicating the content to be viewed and/or recorded (step 716). The system 204 may then check permissions to ensure that the viewing/recording operation can be performed by the requesting user on the selected folder (step 718), and where such permissions exist, will cause the content (or the content associated with the content) to be provided to the requesting set-top box 312 for viewing and/or recording (step 720). For example, where the shared folder is stored with system 204 (e.g., in shared folder store 1614), the system 204 may transmit the content to the set top box 312 (e.g., streaming, downloading into storage) for playback and/or recording by the set-top box 312. Where the content is a broadcast program to be shown in the future, the system 204 may, for example, (a) transmit a message to set-top box 312 setting an alert to be generated at the date and time of the broadcast, (b) set an alert in system 204 which will generate a message to be sent to the set-top box 312 at the time and date of the broadcast alerting the user of the impending broadcast, or (c) configure a recording for the broadcast in a recording facility of set-top box 312.

In another example, where the shared folder is stored with a set-top box 312 (e.g., in shared folder store 405), the system 204 may issue a message to such set top box 312 instructing the set-top box 312 to (a) play the selected content on the attached television 314 (where the set top box 312 is local to the requester), (b) send a message instructing a source set-top box 312 of the content to provide the selected content to the requesting set-top box 312 over access network 108 (where the source set-top box 312 is remote from the requesting set top box 312). Similar to the case where the shared folder is stored with system 204, where the content is a broadcast program to be shown in the future, the system 204 may, for example, transmit a message to requesting set-top box 312 setting an alert to be generated at the date and time of the broadcast, (b) set an alert in system 204 which will generate a message to be sent to the set-top box 312 at the time and date of the broadcast alerting the user of the impending broadcast, or (c) set a recording for the broadcast in a recording facility of requesting set-top box 312.

FIG. 8 is a flow chart of an exemplary method 800 for obtaining access permissions to a user's shared folder. As shown, a user may request permission to access a shared folder owned by another subscriber via a network terminal, such as a set top box 312 (step 802). For example, the user may wish to add a new friend to the user's trusted sources list. A user may do so, for example, by providing the other subscriber's identification information into a user interface provided at set-top box 312 (step 804). This identification information may be, for example, an identification number corresponding to the subscriber's set top box. The set-top box 312 sends the request message to system 204 over access network 108, which may then forward the request to the other subscriber (step 806). Service provider 102 may authenticate the user and other subscriber's identifiers to ensure the user and other subscriber have valid subscriptions to enhanced television services. After successful authentication, service provider 102 may then transmit the message request to the set-top box 312 corresponding to the subscriber's identifier. In another embodiment, users without enhanced services subscriptions may request permission to access a friend's shared folder, or no authentication check may be performed.

The other subscriber receives the user's permission request, and the set-top box 312 for the other subscriber provides a display related to the request (step 808). The display may read, for example, "John wishes permission to provide program recommendations to your shared folder." Alternatively, the request message may be stored as part of a "messages" interface of user interface 404 of the subscriber's set-top box 312. The other subscriber may also receive the request via, for example, e-mail, instant message, cell phone, regular mail, etc.

In response to the permission request, the other subscriber may indicate that the requesting user should be added to the access control list for the shared folder (perhaps including specific access limitations), or deny the user's permission request (step 810). The display provided to the user (noted above) may include a facility to make such a selection. For example, in the case of a local town's shared folder, the town may allow the town's members to view, but not recommend content to, the town's shared folder, so a request from a town resident to access the town folder may cause the resident to be added to the access control list for the folder, but restricted to "view only" access permissions. The other subscriber may provide the response to system 204, for example using set-top box 312 over access network 108 (step 812), and the system 204 may set (or not set) the permissions accordingly, and send a message to the requesting subscriber indicating the result of the other subscriber's response (step 814).

Other embodiments of the shared folder system will be apparent to those skilled in the art from consideration of preferred embodiments described herein. For example, the shared folder service provider may partner with a commercial application to advertise products by sending advertisements of the products to the shared folder of users. In another example, users may opt in to receive recommendations from a trusted source such as a PBS station. Using an automated system, the PBS station could periodically send recommendations to the users' shared folders.

It is intended that the specification and examples described herein be considered as exemplary only, with a true scope and spirit of the invention being indicated by the following claims.

What is claimed is:

1. A method comprising:
receiving, at a service provider device via a network, a request from a user, to add content information to a first shared folder associated with a first subscriber and to a second shared folder associated with a second subscriber;
determining, at the service provider device, that the first shared folder is stored at customer premises equipment associated with the first subscriber;
requesting, by the service provider device, first shared folder information from the customer premises equipment via the network, wherein the first shared folder information includes first access control information and first content restrictions associated with the first shared folder;
determining, at the service provider device, that the second shared folder is stored at the service provider device;
retrieving, by the service provider device, second shared folder information from the second shared folder, wherein the second shared folder information includes second access control information and second content restrictions associated with the second shared folder;
determining, at the service provider device, whether to add the content information to the first shared folder based on the first shared folder information obtained in response to the requesting; and
determining, at the service provider device, whether to add the content information to the second shared folder based on the retrieved second shared folder information.

2. The method of claim 1, wherein determining whether to add the content information to the first shared folder comprises:
determining, based on a user identifier included in the request, whether the user has requisite access permissions identified in the first access control information, and
determining whether the content information complies with the first content restrictions.

3. The method of claim 2, wherein, in response to determining that the user has the requisite access permissions and the content information complying with the first content restrictions, the method further comprising:
notifying the first subscriber of the request; and
sending, via the network, the content information to the customer premises equipment, for adding to the first shared folder, upon receiving a response from the customer premises equipment in response to the notifying.

4. The method of claim 3, wherein notifying the first subscriber comprises:
transmitting, to the customer premises equipment via the network, a message identifying the user and the content information.

5. The method of claim 1, wherein determining whether to add the content information to the second shared folder comprises:
determining, based on a user identifier included in the request, whether the user has requisite access permissions identified in the second access control information,
determining whether the content information complies with the second content restrictions; and wherein the method further comprises:
adding the content information to the second shared folder in response to determining that the user has the requisite access permissions and the content information complies with the second content restrictions.

6. The method of claim 1, wherein receiving a request to add content information comprises:
receiving a recommendation identifying recommended content and a source for accessing the recommended content, or
receiving recorded content to be added to the first shared folder and the second shared folder.

7. The method of claim 1, wherein the first access control information differs from the second access control information, and the first content restrictions correspond to the second content restrictions.

8. A network device comprising:
a communication interface;
a memory to store instructions; and
one or more processors to execute the instructions to:
receive, via a network and via the communication interface, a request from a user, to add content information to a first shared folder associated with a first subscriber and to a second shared folder associated with a second subscriber,
determine that the first shared folder is stored at customer premises equipment associated with the first subscriber,
request, via the communication interface, first shared folder information from the customer premises equipment via the network, wherein the first shared folder information includes first access control information and first content restrictions associated with the first shared folder,
determine that the second shared folder is stored in the memory,
retrieve, from the memory, second shared folder information from the second shared folder, wherein the second shared folder information includes second access control information and second content restrictions associated with the second shared folder,
determine whether to add the content information to the first shared folder based on the first shared folder information obtained in response to the requesting, and
determine whether to add the content information to the second shared folder based on the retrieved second shared folder information.

9. The network device of claim 8, wherein, to determine whether to add the content information to the first shared folder, the one or more processors execute the instructions to:
determine, based on a user identifier included in the request, whether the user has requisite access permissions identified in the first access control information, and
determine whether the content information complies with the first content restrictions.

10. The network device of claim 9, wherein, in response to determining that the user has the requisite access permissions and the content information complies with the first content restrictions, the one or more processors further execute the instructions to:
notify the first subscriber of the request; and
send, via the network, the content information to the customer premises equipment, for adding to the first shared folder, upon receiving a response from the customer premises equipment in response to the first subscriber being notified of the request.

11. The network device of claim 10, wherein, to notify the first subscriber, the one or more processors execute the instructions to:
transmit, to the customer premises equipment via the network, a message identifying the user and the content information.

12. The network device of claim 8, wherein, to determine whether to add the content information to the second shared folder, the one or more processors execute the instructions to:
determine, based on a user identifier included in the request, whether the user has requisite access permissions identified in the second access control information,
determine whether the content information complies with the second content restrictions; and wherein the one or more processors further execute the instructions to:
add the content information to the second shared folder in response to determining that the user has the requisite access permissions and the content information complies with the second content restrictions.

13. The network device of claim 8, wherein, to receive a request to add content information, the one or more processors execute the instructions to:
receive a recommendation identifying recommended content and a source for accessing the recommended content, or
receive recorded content to be added to the first shared folder and the second shared folder.

14. The network device of claim 8, wherein the first access control information differs from the second access control information, and the first content restrictions correspond to the second content restrictions.

15. A non-transitory computer-readable medium having stored thereon sequences of instructions which, when executed by at least one processor, cause the at least one processor to:
receive, via a network, a request from a user, to add content information to a first shared folder associated with a first subscriber and to a second shared folder associated with a second subscriber,
determine that the first shared folder is stored at customer premises equipment associated with the first subscriber,
request first shared folder information from the customer premises equipment via the network, wherein the first shared folder information includes first access control information and first content restrictions associated with the first shared folder,
determine that the second shared folder is stored in a memory at a service provider,
retrieve, from the memory, second shared folder information from the second shared folder, wherein the second shared folder information includes second access control information and second content restrictions associated with the second shared folder,
determine whether to add the content information to the first shared folder based on the first shared folder information obtained in response to the requesting, and
determine whether to add the content information to the second shared folder based on the retrieved second shared folder information.

16. The non-transitory computer-readable medium of claim 15, wherein, to determine whether to add the content information to the first shared folder, the instructions cause the at least one processor to:
determine, based on a user identifier included in the request, whether the user has requisite access permissions identified in the first access control information, and
determine whether the content information complies with the first content restrictions.

17. The non-transitory computer-readable medium of claim 16, wherein, based on the user having the requisite access permissions and the content information complying with the first content restrictions, the instructions cause the at least one processor to:
notify the first subscriber of the request, and
send, via the network, the content information to the customer premises equipment, for adding to the first shared folder, upon receiving a response from the customer premises equipment in response to the first subscriber being notified of the request.

18. The non-transitory computer-readable medium of claim 17, wherein, to notify the first subscriber, the instructions cause the at least one processor to:
transmit, to the customer premises equipment via the network, a message identifying the user and the content information.

19. The non-transitory computer-readable medium of claim 15, wherein, to determine whether to add the content information to the second shared folder, the instructions cause the at least one processor to:
determine, based on a user identifier included in the request, whether the user has requisite access permissions identified in the second access control information,
determine whether the content information complies with the second content restrictions; and wherein the one or more processors further execute the instructions to:
add the content information to the second shared folder based on the user having the requisite access permissions and the content information complying with the second content restrictions.

20. The non-transitory computer-readable medium of claim 15, wherein, to receive a request to add content information, the instructions cause the at least one processor to:
receive a recommendation identifying recommended content and a source for accessing the recommended content, or
receive recorded content to be added to the first shared folder and the second shared folder.

* * * * *